Jan. 21, 1947. C. E. IVES 2,414,529
SPLIT LOCKING RING FOR PRESSURE COOKER CLOSURES
Filed Dec. 1, 1943 3 Sheets-Sheet 1
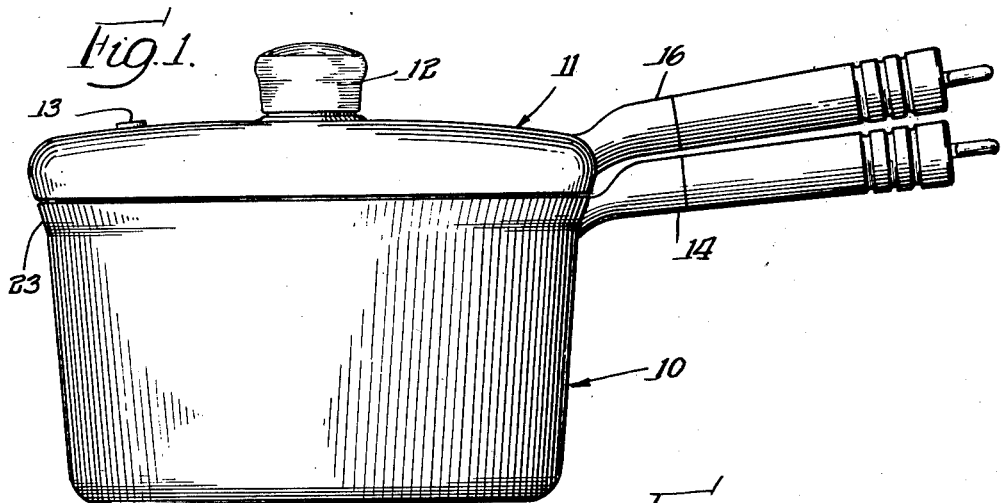
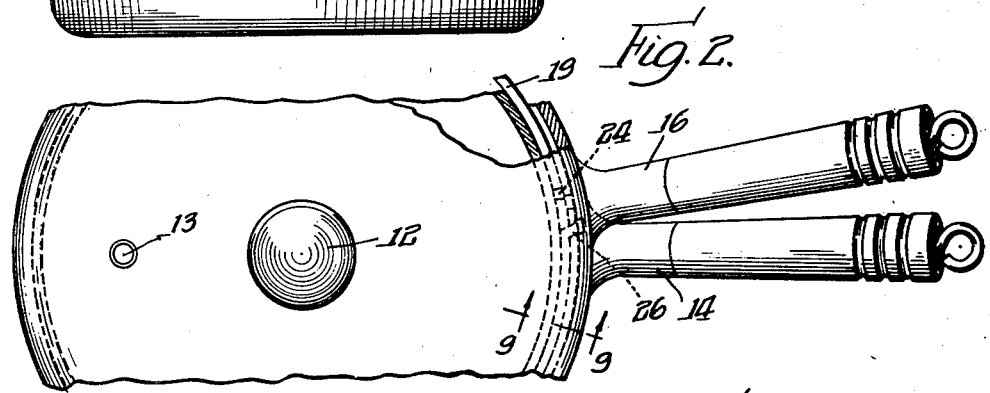
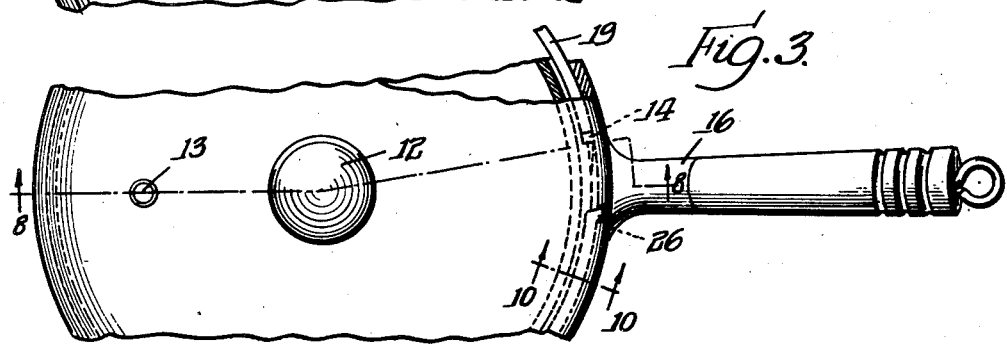
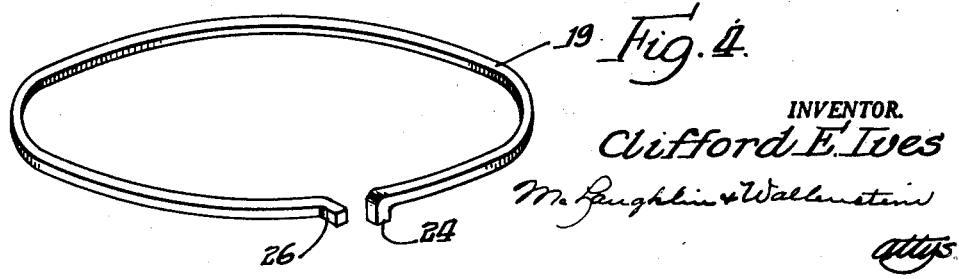
INVENTOR.
Clifford E. Ives
McLaughlin & Wallenstein
attys.

Jan. 21, 1947. C. E. IVES 2,414,529
SPLIT LOCKING RING FOR PRESSURE COOKER CLOSURES
Filed Dec. 1, 1943 3 Sheets-Sheet 2
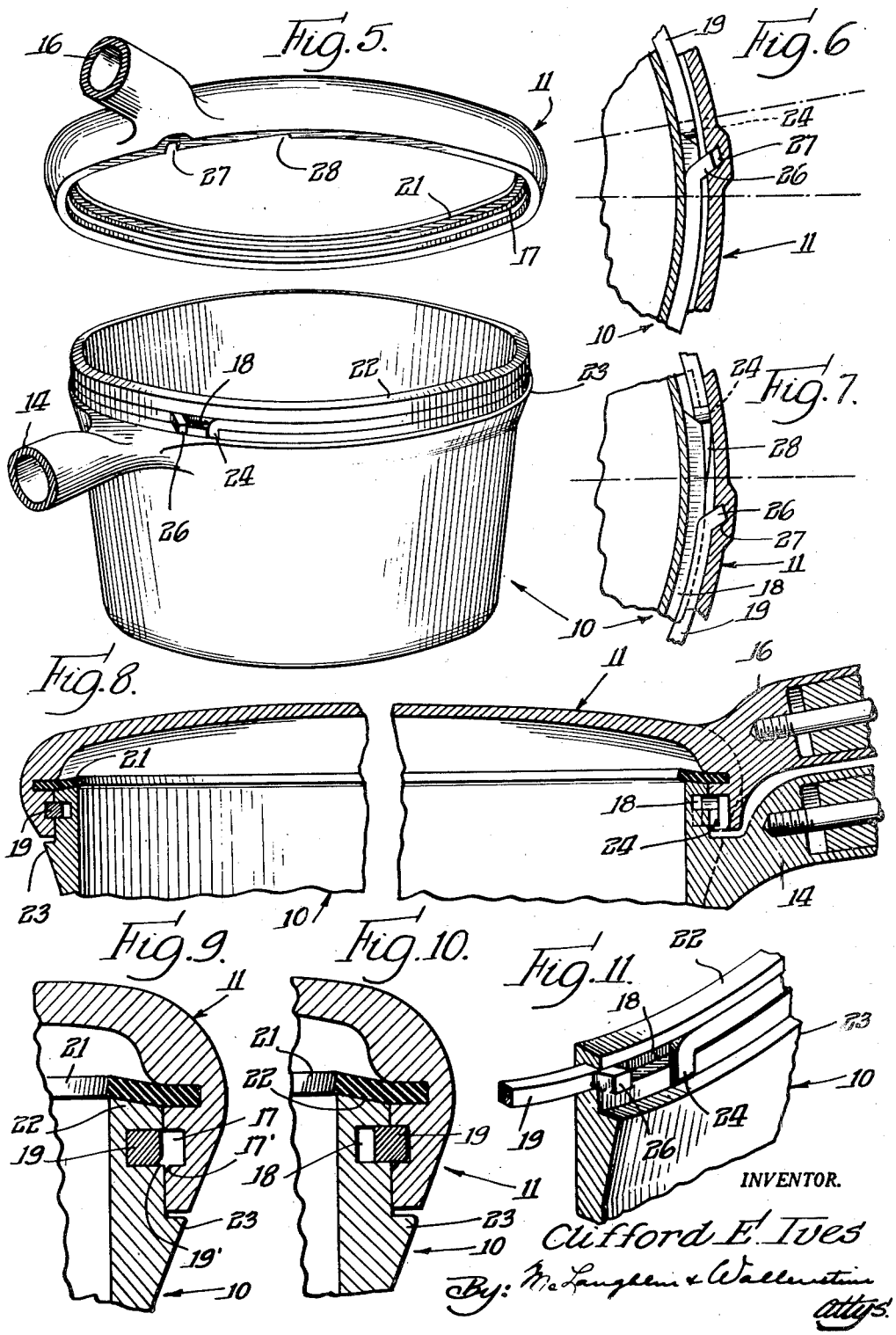
INVENTOR.
Clifford E. Ives
By: McLaughlin & Wallenstein
attys.

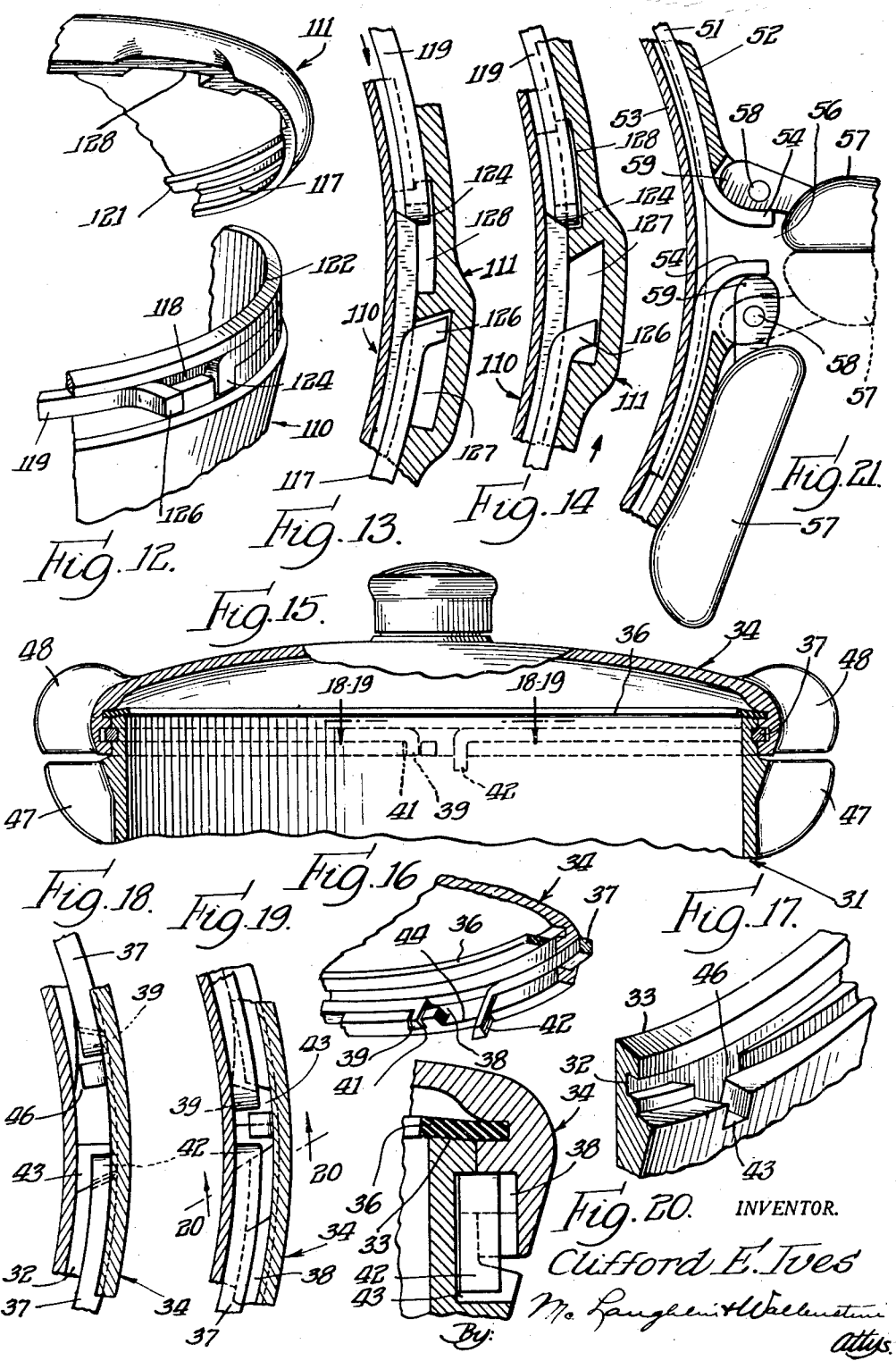

Patented Jan. 21, 1947

2,414,529

UNITED STATES PATENT OFFICE 2,414,529

SPLIT LOCKING RING FOR PRESSURE COOKER CLOSURES

Clifford E. Ives, Chicago, Ill., assignor to National Aluminum Manufacturing Co., Peoria, Ill.

Application December 1, 1943, Serial No. 512,420

13 Claims. (Cl. 220—61)

My invention relates to pressure cookers and has for its object the provision of an improved pressure cooker adapted principally for use in the home or kitchen.

Pressure cooking in the kitchen has become more important due to recently discovered advantages thereof; and attempts have been made to produce pressure cookers capable of being made in a range of sizes, and having other features making them suitable for ordinary kitchen use. While a large pressure cooker can be successfully used, even though its structure and operating features are involved and complicated, a pressure cooker adapted to be used in the kitchen should be relatively simple and also relatively fool-proof. In addition to simplicity, the construction employed should be one making possible simple cleaning of all parts of the pressure cooker by means readily available to the user thereof. So far as I know, no pressure cooker heretofore known has satisfied all of the requirements discussed hereinabove.

The pressure cooker of my invention employs a simple design of pot and cover secured together by a simple locking member carried by either the pot or cover and operable to perform its locking function on mere relative rotatory movement between the pot and cover. Rotatory movement between the pot and cover is accomplished suitably by grasping extending pot and cover handles and moving them through but a slight arc to bring the handles into vertical alignment. Actual seal of the joint between the pot and cover is accomplished by means of an annular resilient sealing ring. The construction and arrangement of the sealing ring, pot and cover are such that, the cover being held in position on the pot by the locking mechanism, and the sealing ring held relatively lightly on the rim of the pot and bridging the annular joint between the pot and cover, an increased pressure within the cooker forces the sealing ring more tightly against the pot and cover joint and improves the seal. The locking mechanism between the pot and cover, being rendered effective by slight relative movement between the pot and cover, is also rendered ineffective by a similar but reverse movement. Enough friction is created by steam pressure forcing the sealing ring against the pot and cover surface so that it is substantially impossible to rotate the cover, while there still exists an appreciable steam pressure in the pot. If the cover should be turned while pressure still exists in the pot the residual pressure within the cooker is sufficient to prevent the locking mechanism from returning to unlocked position, thereby continuing to maintain the lock and seal between the pot and cover. When the pressure within the cooker drops to a safe minimum, then the locking mechanism can be returned to ineffective position, and the cover may be removed. In relatively small sizes of cookers, simple pressure release mechanism may be provided so that long standing is not required before the cover is removed, or the pressure may be reduced by merely removing the cooker from the fire and allowing it to stand.

The simple, effective locking mechanism referred to hereinabove preferably comprises oppositely facing annular grooves in the pot and cover in one of which grooves a broken wire locking ring is entirely contained, except for projecting ends thereof, one of which ends is engaged by the cover and one of which is engaged by the pot. The ends of the locking ring being so engaged in the manner described, relative movement of the pot and cover may now be made effective to expand or contract the ring, so that the said ring will be entirely confined within one of the said annular grooves, in which position there is no locking function, or occupy a space between but within the two grooves, in which case the cover is locked in position on the pot. Preferably the locking ring is carried in a groove on the exterior of the pot and is adapted to be expanded into a groove on the interior of a flange portion of the cover, thereby securing certain advantages, some of which will appear from further description of the invention.

I have shown, in the drawings, several specific embodiments of my invention and in a further portion of this specification have described such embodiments, including additional details and advantages thereof. Further objects and features of the invention will be apparent from a consideration of such detailed description and the accompanying drawings.

In the drawings:

Fig. 1 is a perspective view of a pressure cooker embodying the features of my invention;

Figs. 2 and 3 are fragmentary, plan views of the pressure cooker shown in Fig. 1, with some details dotted in and shown by partial sections thereof, the views showing, respectively, the unlocked and locked positions of the locking ring;

Fig. 4 is a perspective view of a locking ring as it appears when removed from the pot;

Fig. 5 is a perspective view of the pot and cover, with the cover occupying the position which it will assume just before being placed in position on the pot. (In this view the extending portions of the handles have been removed to conserve space);

Figs. 6 and 7 are slightly enlarged fragmentary, transverse sectional views taken through the pot and cover and showing the locking ring in plan, the parts having the same positions as in Figs. 2 and 3 and the locking ring being shown, respectively, in contracted and expanded positions;

Fig. 8 is an enlarged fragmentary, irregular transverse sectional view taken on the line 8—8 of Fig. 3;

Figs. 9 and 10 are still further enlarged fragmentary sectional views taken through the locking ring, the figures showing the ring in unlocked and locked positions, respectively, and being taken on the lines 9—9 and 10—10 of Figs. 2 and 3, respectively;

Fig. 11 is an enlarged fragmentary perspective view with some of the parts broken away showing that portion of the upper rim of the pot where the ends of the locking ring terminate;

Fig. 12 is a fragmentary view similar to Fig. 5 but showing a slightly modified form of the invention;

Figs. 13 and 14 are fragmentary transverse sectional views, of the modified form shown in Fig. 12, showing the locking ring in plan elevation, the parts being in two different positions which they may assume;

Fig. 15 is a transverse sectional view through the upper part of a pot and cover showing a still further modification of the invention;

Fig. 16 is a fragmentary perspective view, of the modified form shown in Fig. 15, with parts broken away to show construction, the view looking upwardly toward the inside of the cover and showing the ends of the locking ring;

Fig. 17 is a fragmentary perspective view of the portion of the upper outside surface of the pot in which one projecting end of the locking ring engages;

Figs. 18 and 19 are fragmentary transverse sectional views, of the modified form shown in Fig. 15, through the pot and cover showing the locking ring in plan elevation, the views showing the unlocked and locked positions, respectively;

Fig. 20 is a sectional view taken on the line 20—20 of Fig. 19; and

Fig. 21 is a fragmentary transverse sectional view showing still another form of the invention wherein the locking ring is carried in the cover and separate means is provided on the cover for controlling the position of the locking ring.

The pressure cooker shown in the drawings comprises a pot 10 and cover 11. The cover may carry a suitable combination pressure gauge and pressure release valve 12 and a separate pressure release valve 13. The pot has a handle 14 comprising an integral portion and an extension which may be formed of wood or the like. A similar handle 16 is carried by the cover.

The cover has an annular flange portion adapted to set outside the upper rim of the pot, and the said flange is provided with an annular internal groove 17 which, when the cover is placed in position on the pot, faces an outer annular groove 18 below the top edge of or rim of the pot. A locking ring, generally indicated by the reference character 19 (see Fig. 4), is adapted to be housed entirely within the groove 18 on the pot or to be expanded into the groove 17 where it will occupy a position as a lock or key between the cover and pot, as shown in Fig. 10. The cover also carries an annular resilient sealing ring 21 in an annular groove positioned above the groove 17 and this sealing ring is adapted to lie on the smooth upper edge or rim 22 of the pot. An annular thickened portion 23 of the pot is provided to form a smooth or streamlined appearance between the pot and cover as illustrated in Fig. 1. The space shown between the bottom edge of the annular flange of the cover and the top of the shoulder above the annular thickened portion 23 shows that the cover is not meant to rest upon this shoulder, but the sole support for the cover is between the sealing ring and the upper rim of the pot. If, in actual design, the cover should touch the shoulder above the thickened portion 23, the contact should not be sufficient to prevent the intended functioning of the other parts as will be described, and specifically should not prevent the sealing ring from engaging the upper rim of the pot or an equivalent portion thereof.

In the embodiment shown, the locking ring 19 is split or broken at least at one point and the annular portion thereof is normally housed entirely within the groove 18 on the exterior of the pot; it is adapted to be expanded to the position shown in Fig. 10, however, to engage in the groove 17 and lock the cover in position. To expand the locking ring 19 in the intended manner, one end 24 thereof is turned downwardly into a bottom recess communicating with the groove 18, and the other end 26 extends generally radially outwardly to engage in an edge recess 27 of the cover the upper portion of which is aligned with the groove 17. The shape and position of the recess 27 are such that the cover can be placed down over the pot, thereby to engage the end 26 in the upper portion of the recess 27 and permit the sealing ring 21 to rest on the upper rim of the pot. The effect of engaging one end 24 in a recess on the pot and the other end 26 in a recess on the cover in the manner described, is to cause these ends to be pulled away from each other when the cover is rotated in a clockwise direction on the pot, to thereby enlarge the locking ring 19 and cause it to expand into the groove 17 on the cover. The split ring comprising the locking member is formed of spring material and normally will contract on itself, thereby returning to a size as small as, or preferably somewhat smaller than, the outer periphery of the groove 18 in which it is housed. Merely releasing the ends is adequate therefor, in the absence of more than usual friction, to cause the ring to withdraw itself from the groove 17 and release the cover. Thus merely engaging opposite ends of the ring with portions of the cover and pot, respectively, and rotating the cover and pot relatively to each other, will cause an expansion or contraction of the ring in a desired manner to lock the cover in position or permit its release. The construction provides for a locking member, specifically the ring, which can readily be withdrawn, if desired, for cleaning.

While the locking ring may be effective to hold the cover in position even though it engage over considerably less than the full circumference, still an advantage is obtained by assuring engagement throughout the entire circumference, or as much of the circumference of the pot and cover as are subtended by the ring. Several features of construction contribute to the desired result. For one thing, it will be noted that the groove 17 has a depth equal to only about ½ the thickness of the locking ring and hence it is impossible for the locking ring or any portion of it to be entirely removed from the groove 18. If the ends 24 and 26 are separated a sufficient distance to expand the locking ring 19 fully, therefore, there is a tendency to cause a uniform expansion merely from the fact that the ring is limited in its expansion movement at any given circumferential position by the shallow character of the groove 17. In addition to this fact, the projecting end 26, while generally radial, nevertheless projects at an acute angle to the radius (as illustrated particularly in Figs. 6 and 7), and the surfaces of the recess 27 and the said end 26 which come together produce a cam action tending to force outwardly the end 26 and that portion of the ring 19 immediately adjacent thereto. Similarly, the downwardly projecting end 24 is shaped to have a cam action against the surface of the pot against which it engages, that is to say, the surface of the recess below the groove 18 into which the end 24 projects. The ends 24 and 26 and the corresponding recesses into which they project cooperate to some extent also to force the ends 24 and 26 out of the groove 17 when the cover is rotated in a counterclockwise direction, as will be discussed somewhat more in detail hereinafter. In order to allow for outward movement of the end 24, a recess 28 (see Fig. 5) is provided in the cover below the groove 17. The drawings illustrate this recess 28 as extending to the bottom edge of the cover, but it may be concealed, if desired. As shown in the drawings, this recess may be disposed on a slant and hence acts also as a cam surface in order to force the end 24 back into unlocked position when the cover is rotated in a counter clockwise direction in the manner previously described.

The locking arrangement between the cover and pot has the function of initially sealing the cover in position and retaining it in position against a pressure generated therein and applied against the entire underside area of the cover. The actual seal, however, is not by means of the locking feature, but due to the fact that the sealing ring 21, being initially brought to position against the rim 22 with a slight initial pressure, and the pot and cover being maintained in proper position with respect to each other by means of the locking ring, continued internal gaseous pressure increase within the container comprising the pot and cover merely has the effect of intensifying the pressure of the seal against the joint between the pot and cover. The seal is improved, therefore, as the internal pressure is increased. The upper surface 22 is at a slight angle, as shown, for example, at an angle of about 5 degrees to the horizontal. The parts are finished so that the weight of the cover is about sufficient to flex the sealing ring to the position shown in the drawings so as to engage the sealing ring at the outside edge of the pot and leave the grooves 17 and 18 squarely facing each other. This would permit mere rotation of the cover with respect to the pot in the intended manner to expand the locking ring 19 and lock the cover in position. To provide for some manufacturing tolerance, however, and assure proper expansion of the locking ring and initial proper engagement of the sealing ring against the upper edge or rim of the pot, the lower edge of the ring 19 is partly slanted or bevelled as indicated at 19' in Figs. 9 and 10, and the lower edge of the cover at the recess 17 is also slightly bevelled as indicated at 17' in Figs. 9 and 10. Manufacturing tolerances are set up to cause the cover to set too high if the dimensions are not exact and in any case to cause the parts to assume the general position indicated in the drawings when the locking ring is expanded. Thus, the locking ring 19 has a slight wedging action whereby to pull the cover down slightly and engage the sealing ring 21 snugly against the smooth upper edge 22 of the pot. It must be borne in mind that it is not essential that this downward pressure be appreciable in order to produce a proper seal, mere weight of the cover itself being sufficient. The construction allows for some manufacturing tolerance, however, assuring proper operation of the locking ring, without the possibility of raising the sealing ring 21 away from the edge 22. It should be remembered that while the outside surface of the pot and the inside surface of the cover above and below the locking ring 19 preferably fit relatively closely, they are by no means close enough to comprise a seal, although a sliding fit commonly provided on pots and covers is desirable.

When employing the pressure cooker of my invention, the product to be cooked is placed in the pot with the minimum amount of water required (for example, half a cup), the cover placed in position with the end 26 entering the recess 27 (the position indicated in Figs. 2 and 6), and the cover rotated in a clockwise direction with respect to the pot to the position indicated in Figs. 3 and 7. I have found that this movement need be no more than about 5 degrees of the total circumference in order adequately to expand the locking ring and completely lock the cover to the pot. Heat is then applied and, the pressure within the pot quickly rising to that desired as shown by the pressure gauge, the pressure is maintained by continued heating for the requisite period of time. When the desired pressure has been attained, only slight continued application of heat is necessary to maintain it, and cooking occurs in a short time while the said pressure is maintained. For vegetables, the desired pressure need be maintained for only a matter of minutes, in some instances, less than a minute and at the most less than ten minutes. Meats are thoroughly cooked in approximately ½ hour or less. After the desired time has elapsed at the pressure required, the cooker is removed from the source of heat. The pressure is allowed to decrease to a safe point by normal cooling, or the release valve 12 may be engaged with a suitable instrument to release the pressure. With the device of my invention, it is impossible to remove the cover before a minimum safe pressure is reached because at high pressures it is impossible to rotate the cover with respect to the pot, and when the pressure has dropped sufficiently to permit such rotation (see Figs. 12 to 14, inclusive), the locking ring will not return to its normal position until the pressure has reached a safe minimum. It should be noted, however, that with the construction shown in Figs. 5 to 7, inclusive, rotation of the cover in a counterclockwise direction will force the locking ring back into the groove 18 and unlock the cover, it being impossible to so turn the cover, however, as long as appreciable steam pressure exists in the pot.

In addition to the simplicity of construction and operation of the pressure cooker of my invention, there is the added advantage of simplicity of maintenance, particularly so far as cleaning is concerned. The locking ring may readily be removed for cleaning, if desired, without stretching it beyond its elastic limit and depriving it of its capacity to function properly. The character of this locking ring may be understood from the fact that with a fair size pressure cooker intended for family or home use, and having a capacity of 2 to 5 quarts or thereabouts, the locking ring need be no larger than ⅛ inch in cross section. Even a locking ring of this size may have at least 100 times the safety factor demanded for the highest normal pressure operation for such a pressure cooker. The locking ring is suitably formed of spring steel and may be coated with chromium or other suitable rust inhibiting material. The pot and cover are preferably formed of aluminum alloy, preferably a relatively stainless type of aluminum alloy containing a proportion of nickel which is now available and which, in addition to relative stainlessness, has the advantage of high strength. The extending portions of the handle may be formed of wood or plastic. It will be noted that my construction permits maintaining the handles in such a way as to facilitate cleaning, and also places the handles in such a position that they will be out of the way of the flame and can be used together as a single handle in a very advantageous manner.

The modification shown in Fig. 12 to Fig. 14, inclusive, may be substantially identical with that shown in the previous figures with the exception that, while the locking ring is positively forced outwardly, there is no provision to force the ends inwardly on counterclockwise movement of the cover. In this figure the same reference characters are employed as in the first described embodiment with the numeral 1 as a prefix to designate similar or generally corresponding parts in the two embodiments. Thus the locking ring 119 is carried in a groove in the pot 110 the same as in the previously described embodiment but the end 126 projects into an elongated recess 127 which will not have the effect of returning the locking ring when the cover is turned in a counterclockwise direction; and the recess 128 is uniform throughout and, therefore, has no cam action. This makes it possible, so far as mechanical construction is concerned, to return the cover to original unlocked position without forcing any portion of the ring out of the recess 117. It should be borne in mind that the engagement of the sealing ring 121 against the rim 122 when there is any substantial steam pressure within the pot makes it impossible to turn the cover if there is no means provided other than an ordinary relatively short handle. In relatively small pots intended for household use, the added precaution provided for with the construction of Figs. 12 to 14, inclusive, is substantially unnecessary and only in unusual cases would be used. The function of this construction, however, is brought out amply by Figs. 13 and 14. In Fig. 13, the cover has just been moved the maximum distance permitted in the direction indicated by the arrow and the locking ring 119 has been forced outwardly so as entirely to fill the groove 117 on the cover. In Fig. 14, the cover has been moved to the maximum distance permitted in the direction shown by the arrow, that is to say, in a counterclockwise direction with respect to the pot. The end 124, projecting into the recess 128, and the end 126, projecting into the recess 127, are merely moved to opposite ends of these recesses but the locking ring 119 is still expanded into the groove 117. This is due to the fact that there is still residual pressure in the pot causing enough friction between outside surfaces of the locking ring and inside surfaces of the grooves to overcome the spring tension of the locking ring, and prevent its return to the groove 118. As soon as the pressure is reduced to a safe minimum, however, (and the design may require reduction to substantially atmospheric pressure) the locking ring 119 will snap back to the position which it occupies in Fig. 12 and thereby release the cover.

In the form of the device shown in Figs. 15 to 20, inclusive, the locking ring is carried by an inner annular groove in the cover and is contracted to engage in an outer annular groove in the pot. In substantially all other respects the construction and operation are the same as described in the previous embodiments, one difference being, however, that the locking ring occupies slightly more of the circumference of the groove when in locked position than in the previous forms. When the pots are large and the pressure great this may be an advantage. Looking now to the drawings, the pot 31 is provided with an annular groove 32 and has an upper edge or rim 33, the groove 32 and rim 33 cooperating with a locking ring and sealing ring, respectively, carried by the cover. The cover 34 is provided with a sealing ring 36 and a split locking ring 37, disposed in a groove 38. One end 39 of the locking ring engages in a recess 41 communicating with the groove 38 and the other end 42 of the locking ring projects into a bottom recess 43 of the pot. A portion of the bottom of the cover is broken away to leave an edge recess 44 communicating with the groove 38 and through which recess the end 42 of the locking ring 37 extends. This recess 44 is elongated to accommodate the said end 42 regardless of the movement thereof. The pot has an outside recess or cut-away portion 46 into which the end 39 of the locking ring is adapted to be extended when the locking ring is contracted into the groove 32.

In this form, as in the previous forms described, the locking ring is actuated through the rotation of the cover with respect to the pot. Any suitable means for rotating the pot and cover with respect to each other may be employed. In the design shown, the pot has a pair of ears or projections 47 which may also comprise handles and the cover has a pair of ears or projections 48, both the projections 47 and the projections 48 being adapted for grasping the pot or cover, respectively. These projections or ears on the pot and cover may be so constructed and arranged as to be used for the purpose of rotating the pot and cover with respect to each other. Both hands may be used to grasp ears on both the pot and cover in such a way that by twisting the hands in opposite directions while engaging such ears, the pot and cover may be rotated in opposite directions. An arrangement such as this may be utilized wherein greater turning force may be applied than with only a single pair of handles. The projections 47 and 48 may be shaped so that they can be engaged with a suitable tool instead of the hands; but, generally speaking, a tool will not be required in a device constructed in accordance with my invention because only a relatively moderate force is required to operate the locking ring in the absence of a dangerous steam pressure in the pot and the inability to rotate the cover while there is steam pressure in the pot is no disadvantage but definitely a safety feature. The pressure cooker of Figs. 15 to 20, inclusive, however, is so constructed and arranged that the locking ring 37 will not expand into the groove 38 while appreciable steam pressure exists within the pot, because during such time enough friction is created between the top and bottom surfaces of the locking ring and contacting surfaces of the grooves 32 and 38 to more than counterbalance the tendency of the locking ring to expand, and the locking ring will be held in locking position even though the cover 34 should be rotated to a position to release it.

The operation of the pressure cooker of Figs. 15 to 20, inclusive, described immediately hereinabove is substantially the same as the operation of the previously described embodiments. Generally speaking, this design is intended to be employed on somewhat larger sizes of pressure cookers than the previous embodiments; but both this and the other designs may be utilized for substantially all capacities of pressure cookers with which my invention is concerned. A pressure cooker such as described in the last mentioned embodiment can, for example, be used for home canning purposes in which several cans of vegetables or the like may be introduced into the cooker in accordance with a common practice. In this case, the pressure will generally be allowed to decrease gradually to avoid expanding the ends of the cans when they are removed from the cooker. The contents to be cooked are placed in the pot, the cover placed in position and rotated to cause the ring to contract from the groove 38 in the cover to a position within the groove 32 and occupying some of the groove 38 as particularly illustrated in Figs. 15, 19 and 20, and heat applied in a suitable manner. It will be noted that by contracting the locking ring 37, the ends 39 and 42 are brought quite close together, so that substantially the entire circumference of the pot and cover are engaged by the locking ring in the same manner as a key. The sealing ring 36 functions in the same manner as the sealing ring 21 previously described.

Fig. 21 shows a form of device in which a locking ring 51 is adapted to be carried in a suitable groove in a cover 52 but is contracted into a groove in a pot 53, only a portion of the pot and cover being shown in the single figure. The ends 54 of the locking ring 51 extend outwardly through a slot 56 in the side of the cover. Actuating handles 57 are pivoted to the cover at 58 and carry cam ends 59 which are effective to control the positions of the ends 54 and hence the expanded or contracted condition of the locking ring 51. The uppermost of the two handles as seen in the drawings is in position to permit the locking ring to be expanded into the cover, while the lowermost of the handles has been operated from the dotted line position to the full line position, a contiguous portion of the locking ring being shown contracted against the pot 53. This form of the invention differs from those previously described in that the cover and the pot are not required to be rotated with respect to each other, but the locking ring is operated by separate actuating means attached to the cover, such means being equally attachable to the pot as those skilled in the art will understand. This form of device also employs an annular sealing ring carried by the cover and seated against the top rim of the pot in the manner pictured in the previous embodiments, the said sealing ring and top rim of the pot being left out of this figure to simplify the showing of the ring locking mechanism.

The manner of use of the later described embodiments is generally the same as described in connection with the first embodiment, although as to all embodiments various modifications in structure and manner of use are, of course, possible. Using an ordinary gas flame and a relatively small cooker (small family size) pressure can be brought up to 15 to 20 pounds in three or four minutes. It may take ten minutes or longer for this pressure to drop below a cooking temperature, and as long as 30 minutes to drop to zero pressure. These times and pressures must be kept in mind when cooking certain articles. Vegetables such as cauliflower or cabbage, which require only a short cooking time, would be overcooked if the pressure were released slowly, while in the case of meats, the fact that cooking continues for some time after removal from a source of heat may be taken advantage of. Actual use of the cooker depends upon many factors with which my present invention is not concerned. So far as construction is concerned, I have shown and described many details, but the scope of the invention is defined in the claims.

What I claim as new and desire to protect by Letters Patent of the United States is:

1. A pressure cooker comprising a pot having a smooth upper edge, a cover having a lower flange extending around said edge and having an internally projecting sealing ring adapted to lie on said upper edge, a locking member carried by the pot below said sealing ring, and means, responsive to relative movement between the pot and cover when said sealing ring is in position on said upper edge, for expanding said locking member to cause the same to engage said cover and lock the cover in position.

2. A pressure cooker comprising a pot, a cover, said pot and cover having oppositely disposed facing annular grooves, a locking ring broken at at least one point and disposed in one of said grooves, and means responsive to partial rotating movement between said pot and cover for projecting said locking ring to a position within the two said grooves, whereby to secure the cover to the pot.

3. A pressure cooker comprising a pot, a cover, said pot and cover having oppositely disposed facing annular grooves, a locking ring broken at at least one point and disposed in one of said grooves, and means responsive to partial rotating movement between said pot and cover for projecting said locking ring to a position within the two said grooves, whereby to secure the cover to the pot, said ring being returnable to a position within a single groove by reverse relative rotation between the pot and cover.

4. A pressure cooker comprising a pot having a smooth upper edge, a cover having a sealing ring adapted to engage said upper edge, said pot and cover having oppositely disposed facing annular grooves, a locking ring broken at at least one point and disposed entirely in one of said grooves, and means responsive to partial rotating movement between said pot and cover for projecting said locking ring to a position within the two grooves, whereby to secure the cover to the pot, said ring being returnable to a position within a single groove by reverse relative rotation between the pot and cover.

5. A pressure cooker comprising a pot having a smooth upper edge, a cover having a sealing ring adapted to engage said upper edge, said pot and cover having oppositely disposed facing annular grooves, a locking ring broken at at least one point and disposed entirely in one of said grooves, and means responsive to partial rotating movement between said pot and cover for projecting said locking ring to a position within the two grooves, whereby to secure the cover to the pot, said ring being returnable to a position within a single groove by reverse relative rotation between the pot and cover, locking movement of said locking ring being effective to increase pressure of the sealing ring on said upper edge of the pot.

6. A pressure cooker comprising a pot, a cover, said pot and cover having oppositely disposed facing annular grooves, a locking ring broken at one point in its periphery to form two ends, said ring being disposed entirely in one of said grooves and said ends being shaped to extend out of said groove, said cover being shaped to engage one of said ends and the pot shaped to engage the other of said ends when the cover is placed on the pot, whereby relative rotation between the pot and cover is effective to expand or contract said ring, to cause the same to engage in only one groove to release the cover, or within two grooves to lock the cover on the pot.

7. A pressure cooker comprising a pot, a cover, said pot and cover having oppositely disposed facing annular grooves, a locking ring broken at one point in its periphery to form two ends, said ring being disposed entirely in one of said grooves and said ends being shaped to extend out of said groove, said cover being shaped to engage one of said ends and the pot shaped to engage the other of said ends when the cover is placed on the pot, whereby relative rotation between the pot and cover is effective to expand or contract said ring, to cause the same to engage in only one groove to release the cover, or within two grooves to lock the cover on the pot, said cover also including a sealing ring engaging an annular joint between the pot and cover and so disposed as to be pressed against said joint when the cover is held in position on the pot and steam pressure is generated within the pot.

8. A pressure cooker comprising a pot having an annular exterior groove near its upper edge and a short recess communicating with said groove, a locking ring disposed in said groove, said locking ring being broken at one point and having one end extending into said recess and the other end projecting generally radially, a cover having a flange extending over said upper edge and groove of the pot and provided with an internal groove generally facing said groove in the pot, said cover also having an annular recess above said groove and a sealing ring carried in said annular recess and adapted to rest on said upper edge of the pot, said cover flange having a bottom recess communicating with said groove into which said radially projecting end is adapted to be engaged.

9. A pressure cooker comprising a pot having an annular exterior groove near its upper edge and a short recess communicating with said groove, a locking ring disposed in said groove, said locking ring being broken at one point and having one end extending into said recess and the other end projecting generally radially, a cover having a flange extending over said upper edge and groove of the pot and provided with an internal groove generally facing said groove in the pot, said cover also having an annular recess above said groove and a sealing ring carried in said annular recess and adapted to rest on said upper edge of the pot, said cover flange having a bottom recess communicating with said groove into which said radially projecting end is adapted to be engaged, surfaces of said pot and cover recesses engaged by the locking ring ends and said locking ring ends being slanted whereby to exert a direct radial movement of said ends when the locking ring is expanded and contracted.

10. A pressure cooker comprising a pot having an annular exterior groove near its upper edge and a short recess communicating with said groove, a locking ring disposed in said groove, said locking ring being broken at one point and having one end extending into said recess and the other end projecting generally radially, a cover having a flange extending over said upper edge and groove of the pot and provided with an internal groove generally facing said groove in the pot, said cover also having an annular recess above said groove and a sealing ring carried in said annular recess and adapted to rest on said upper edge of the pot, said cover flange having a bottom recess communicating with said groove into which said radially projecting end is adapted to be engaged, surfaces of said pot and cover recesses engaged by the locking ring ends and said locking ring ends being slanted whereby to exert a direct radial movement of said ends when the locking ring is expanded and contracted, said cover also having a slanting edge recess to receive that end of the locking ring engaged by the pot when the locking ring is expanded, the slanting portion of such surface forcing said end inwardly when the cover is turned in a direction to so unlock the said locking ring.

11. A pressure cooker comprising a pot having an annular exterior groove near its upper edge and a short recess communicating with said groove, a locking ring disposed in said groove, said locking ring being broken at one point and having one end extending into said recess and the other end projecting generally radially, a cover having a flange extending over said upper edge and groove of the pot and provided with an internal groove generally facing said groove in the pot, said cover also having an annular recess above said groove and a sealing ring carried in said annular recess and adapted to rest on said upper edge of the pot, said cover flange having a bottom recess communicating with said groove into which said radially projecting end is adapted to be engaged, said pot and cover each having a generally radially projecting handle, said ring ends and recesses being so positioned that the handles are in vertical alignment when the cover is locked on the pot.

12. A pressure cooker comprising a pot having an annular exterior groove near its upper edge and a short recess communicating with said groove, a locking ring disposed in said groove, said locking ring being broken at one point and having one end extending into said recess and the other end projecting generally radially, a cover having a flange extending over said upper edge and groove of the pot and provided with an internal groove generally facing said groove in the pot, said cover also having an annular recess above said groove and a sealing ring carried in said annular recess and adapted to rest on said upper edge of the pot, said cover flange having a bottom recess communicating with said groove into which said radially projecting end is adapted to be engaged, said pot and cover each having a generally radially projecting handle, said ring ends and recesses being so positioned that the handles are in vertical alignment when the cover is locked on the pot, said edge recess on the cover being disposed beneath the cover handle.

13. A pressure cooker comprising a pot and cover, said pot and cover having oppositely facing annular grooves, a locking ring comprising at least one segment substantially entirely disposed within one of said grooves, and means responsive to partial rotatory movement between the pot and cover for projecting said locking ring partially out of its groove and into the other of said grooves, whereby to lock the cover on the pot.

CLIFFORD E. IVES.